Dec. 3, 1968  E. C. ELSNER  3,413,691
BUCKLE
Filed Oct. 21, 1965  2 Sheets-Sheet 1

INVENTOR
EDWIN C. ELSNER

BY  *Jerry K. Harness*
His ATTORNEY

United States Patent Office 3,413,691
Patented Dec. 3, 1968

3,413,691
BUCKLE
Edwin C. Elsner, Tujunga, Calif., assignor to
Aeroquip Corporation, Jackson, Mich.
Filed Oct. 21, 1965, Ser. No. 499,288
2 Claims. (Cl. 24—170)

ABSTRACT OF THE DISCLOSURE

A buckle for use with flexible straps in a cargo control system and particularly adapted for heavy duty applications. The buckle employs two friction surfaces to provide the heavy duty feature. One surface is opposite the movable cam on the release lever and the other is a knurled convex surface on the striker plate which engages the flexible strap when the latter is in tension.

The invention pertains to a buckle, and particularly relates to a heavy-duty buckle of the type employing self-tightening means for increasing the degree of connection with a tension member as the tension within the tension member increases.

The invention is directed to a buckle which is used in industrial applications for permitting adjustment between tension members. In cargo tie-down applications wherein flexible straps or webs, usually of nylon, are employed to tie down aircraft loads, or the like, buckles are employed with the webs to permit adjustability and provide quick release of the webs. As tension forces of considerable degree may momentarily exist in the webs, it is necessary that the buckles be capable of withstanding the maximum designed tension forces of the webs. The buckle constructed in accord with the invention is designed to handle tension forces within the associated webs of five thousand pounds.

It is, therefore, an object of the invention to provide an industrial buckle capable of being employed in very heavy-duty applications.

Another object of the invention is to provide a low-cost, heavy-duty industrial buckle capable of permitting infinitely variable adjustment with the associated tension members in the longitudinal direction of the tension members.

An additional object of the invention is to provide a heavy-duty buckle of the type employing a pivot cam member frictionally engaging the tension member wherein improved friction characteristics between the buckle components and the tension member are provided.

Another object of the invention is to provide a heavy-duty industrial buckle employing a striker plate in opposed relation to a pivoted cam member wherein the striker plate is formed of two components, one of the components being of particular shape and configuration to produce optimum friction-holding characteristics with the tension member, and the other component providing high strength characteristics.

Figure 1:
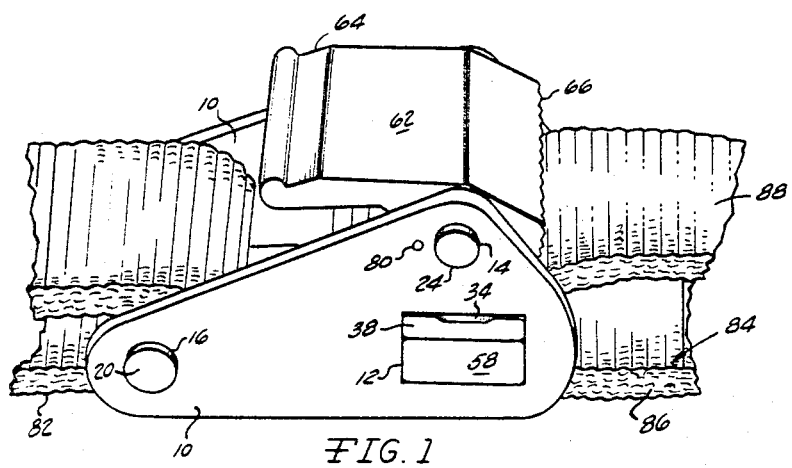
Figure 2:
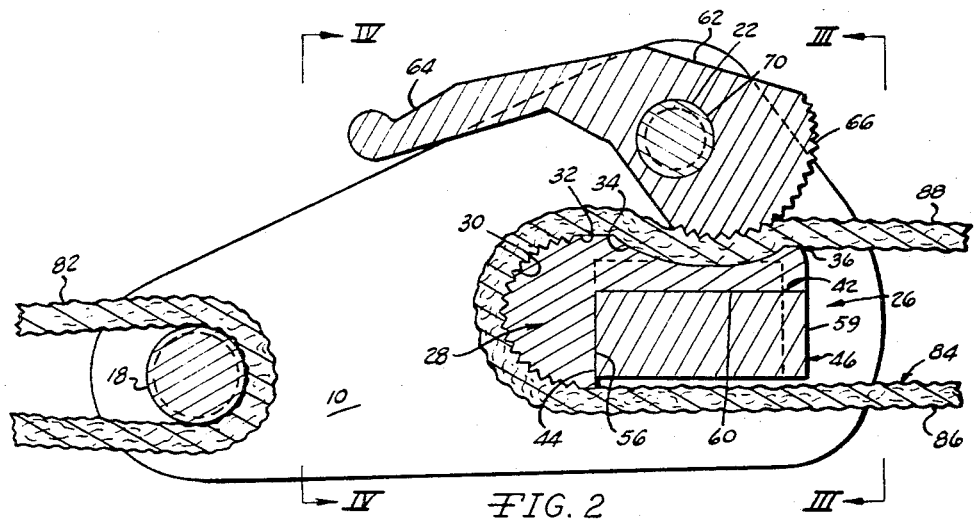
Figure 3:
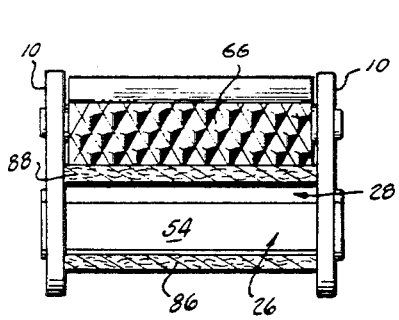
Figure 4:
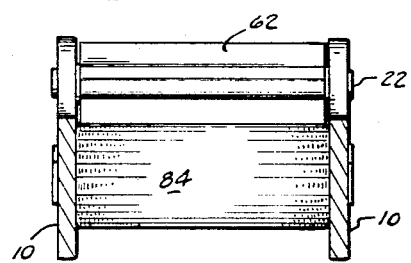
Figure 5:
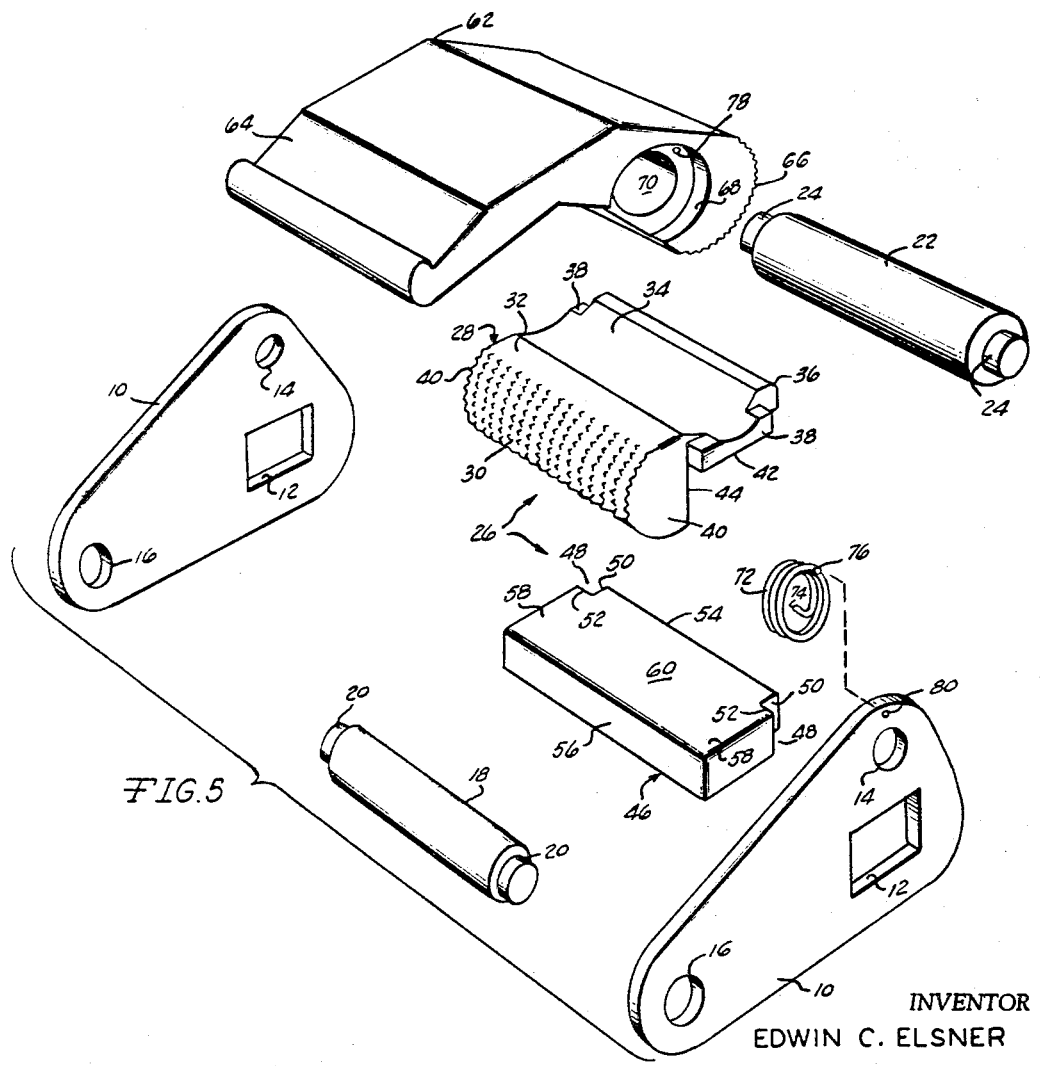

These and other objects of the invention arising from the details and relationships of the components of an embodiment thereof will be apparent from the following description and accompanying drawings wherein:

FIG. 1 is a perspective view of a buckle constructed in accord with the invention, illustrating the associated webs in a tightened condition, FIG. 2 is an elevational, sectional view as taken in a longitudinal direction through the center of the buckle of FIG. 1, FIG. 3 is an elevational, front, sectional view taken along section line III—III of FIG. 2, FIG. 4 is an elevational, rear, sectional view taken along section line IV—IV of FIG. 2, and FIG. 5 is a perspective, exploded view of the components of the buckle of the invention.

The basic components comprising the buckle in accord with the invention are best appreciated from FIG. 5. Side members 10 are each formed in an identical manner, preferably of stamped steel material, having a substantially rectangular opening 12 defined therein for receiving the striker plate components. Above the opening 12 a cylindrical hole 14 is defined for receiving the latch pivot pin. The side members 10 are each also formed with a hole 16 for receiving a tension member cross bar.

The tension member cross bar 18 is of a cylindrical configuration having reduced cylindrical end portions 20 adapted to be closely received within the side member holes 16 and may be swaged over after being inserted into the holes 16. The latch pivot pin 22 is formed of a similar configuration having reduced end portions 24 adapted to be received within the holes 14 and swaged therein. The cross bar 18 and the pivot pin 22 maintain the side members 10 in parallel, spaced relationship, as will be apparent from FIGS. 3 and 4.

The striker plate 26 is formed of two components. One, a die-cast component 28, having a rear convex surface 30, is formed with a knurled surface which is tangent at its upper portion to the upper surface 32 of the striker plate. The upper surface 32 is recessed across its width at 34 for substantially conforming to the configuration of the knurled surface of the latch lever, as will be described later. The striker plate component 28 is radiused at 36 at its forward edge and each end of the component is provided with an integral boss 38 of a rectangular configuration. The bosses 38 extend beyond the striker plate component sides 40 for reception into the side member openings 12, as will be apparent from FIG. 1. The component 28 is formed with a planar surface 42 in parallel, spaced, opposed relation to surface 32, and abutment surface 44 perpendicularly intersects surface 42.

The second striker plate component consists of a high strength member 46 which is of a substantially rectangular configuration, being notched at 48 to define laterally extending surfaces 50 and longitudinally extending surfaces 52. The member 46 also includes a front surface 54 and a rear surface 56. The distance between the transversely extending surfaces 50 corresponds to the width between the sides 40 of the striker plate component 28 and the spacing between the inner surfaces of the side members 10. The surfaces 52, in conjunction with the rear surface 56 and the upper and lower surfaces of the member 46, define rectangular end portions 58 adapted to be received within the lower portion of the side member openings 12. As the upper surface 60 of the member 46 is planar, this surface is adapted to directly engage the lower planar surface 42 of the striker plate component 28 immediately below the concave recess 34. Also, the rear surface 56 will directly engage the abutment surface 44 of the component 28. From FIG. 2 it will be appreciated that the vertical dimension of the enlarged convex portion 30 of the striker plate component 28 is such that the lower surface portion extends below the lower edge of the striker plate member 46 so that the tension member will not engage the member 46 and cause unnecessary wear or interference.

Holding, adjustment and release of the tension member are accomplished by a latch lever 62 pivotally mounted upon the pivot pin 22. The latch lever is provided with a handle portion 64, and on the opposite side of the latch lever with respect to the pin 22, the latch lever is formed with a convex cam surface 66 having a knurled configuration formed thereon. The cam surface 66 is eccentrically related to the pivot pin 22, whereby the surface portions nearest the striker plate 26 are closer to the pin 22 than the upper cam surface portions. Also, the configuration of the cam surface 66 is related to the recess 34 as to substantially correspond thereto when the lever 62 is in the operative position, as in FIG. 1. Adjacent a lateral edge of the latch lever a recess 68 is formed therein concentric with the bore 70 in which the pin 22 is mounted. The recess 68 receives a torsion spring 72 having axially extending ends 74 and 76. A hole 78 is defined in the latch lever 62 for receiving the spring end 74, and a hole 80 is defined in the adjacently disposed side member 10 for receiving the spring end 76. The torsion spring 72 is mounted in such a manner as to tend to pivot the latch lever 62 in the clockwise direction, as viewed in FIGS. 1 and 2.

In operation, a fixed tension member web 82 is looped about the cross bar 18. The adjustable, flexible tension member web 84 is passed under and then over the striker plate 26. That portion of the tension member 84 which is affixed to the fixed member, or load, is represented at 86. The "end" portion of the tension member 84 is represented at 88, and passes over the upper portion of the striker plate below the lever 62, as is apparent from FIG. 2. To tighten the web 84, the portion 88 is pulled firmly in the longitudinal direction away from the buckle. During such tightening, the web slips over the knurled surface 30, and the configuration of the latch lever 62 is such that the knurled cam surface 66 permits the portion 88 to slip under the lever as it moves to the right, FIG. 2. The web portion 86 is, thus, pulled tight and tensioned. Movement of the web 84 in the reverse direction is prevented by the latch lever 62, as the cam surface 66 frictionally engages the upper surface of the web portion 88 and grips the web between the cam surface and striker plate 26. The tendency for the web portion 88 to move to the left is prevented by the "pinching" action of the latch lever cam surface 66 and the striker plate, and due to the shape of cam surface 66 and the relationship of the cam surface to the pin 22, the grip on the tension member increases as the tension increases. As the striker plate recess 34 substantially conforms to the configuration of the cam surface 66 and as the web is of a flexible nature, the recess 34 permits an increased area of contact between the web, latch lever, cam surface and the striker plate 26, as compared to those constructions wherein no concave recess is defined in the striker plate. This increased area of contact minimizes the occurrence of localized stresses in the tension member, reduces wear, and helps prevent fraying of the tension member. Additionally, the knurled surface 30 produces an effective frictional engagement with the web as the portion 86 is tensioned, which contributes to the efficiency of the interconnection of the tension member to the buckle.

Due to the aforedescribed configuration of the buckle components, the buckle is able to withstand high tension forces within the tension members. Failure, due to the forces imposed upon the striker plate 26, is resisted due to the high strength reinforcement provided by the striker plate member 46. The two-piece construction of the striker plate provides effective support of the formed component 28 in the longitudinal direction of the tension forces due to engagement of surface 56 with abutment surface 44, and resistance to the bending forces imposed on the component 28 by the latch lever is resisted by the engagement of surfaces 60 and 42. The primary forces exerted on the component 28 will be at the recess 34 and on surface 30. By employing the member 46, a relatively "weak" material that is easily cast can be used to form component 28, as this component will be primarily subjected to compressive forces.

Release of the tension member 84 is readily accomplished by depressing the lever handle portion 64 to pivot the latch lever cam surface 66 out of engagement with the web portion 88. Thereupon the web may be easily pulled from the buckle by pulling upon the web portion 86.

It is appreciated that various modifications to the invention may be apparent to those skilled in the art without departing from the spirit and scope thereof, and it is intended that the invention be defined only by the scope of the following claims.

I claim:
1. A heavy-duty buckle comprising, in combination,
   (a) a pair of spaced side members,
   (b) means extending between and affixed to said side members adapted to have a first tension member attached thereto,
   (c) a striker plate having spaced ends and a flexible tension member engaging surface, said striker plate extending between said side members, each end being mounted upon a side member,
   (d) pivot means mounted upon and extending between said side members defining a latch lever pivot axis,
   (e) a latch lever mounted upon said pivot means for pivotal movement about said axis, said lever including a convex cam surface, said cam surface being eccentrically related to said axis and in opposed relation to said striker plate tension member engaging surface,
   (f) said striker plate tension member engaging surface being disposed in opposition to said latch cam surface for receiving a second flexible tension member therebetween, said pivot axis being so related to said cam surface and said striker plate engaging surface that, upon said second flexible tension member being interposed between said striker plate and said cam surface and engaged thereby, a tendency for the said second flexible tension member to move in the direction of said pivot axis tends to pivot said lever and increases the frictional engagement of said cam surface and engaging surface with said flexible tension member,
   (g) said striker plate having a convex knurled surface spaced from said engaging surface and adapted to engage said second tension member when the latter is in tension.

2. A heavy-duty buckle comprising, in combination,
   (a) a pair of spaced side members,
   (b) a cross bar extending between and affixed to said side members adapted to have a first tension member attached thereto,
   (c) a striker plate having spaced ends and a flexible tension member engaging surface, said striker plate extending between said side members, each end being mounted upon a side member,
   (d) a pivot pin mounted upon and extending between said side members defining a latch lever pivot axis,
   (e) a latch lever mounted upon said pin for pivotal movement about said axis, said lever including a convex cam surface, said cam surface being eccentrically related to said axis and in opposed relation to said striker plate tension member engaging surface,
   (f) a recess defined in said striker plate tension member engaging surface in opposition to said latch cam surface whereby a flexible tension member interposed between said striker plate and cam surface is forced into said recess by said cam surface, said pivot axis being so related to said recess that, upon a flexible tension member being interposed between said striker plate and said cam surface and engaged thereby, a tendency for the flexible tension member to move in the direction of said pivot axis tends to pivot said lever and increases the frictional engagement of said cam surface and recess with said flexible tension member,
   (g) said striker plate having a convex knurled surface of a generally semicylindrical contour spaced from said engaging surface and adapted to engage said second tension member when the latter is in tension.

References Cited

UNITED STATES PATENTS

| | | | |
|---|---|---|---|
| 2,622,293 | 12/1952 | Wermlinger | 24—170 |
| 292,004 | 1/1884 | Garrigus | 24—191 X |
| 1,005,341 | 10/1911 | Signorelli. | |
| 2,981,993 | 5/1961 | Elsner | 24—170 |
| 2,998,626 | 9/1961 | Prete | 24—170 |

BOBBY R. GAY, *Primary Examiner.*

ERNEST SIMONSEN, *Assistant Examiner.*